United States Patent
Liu et al.

(10) Patent No.: US 8,588,182 B2
(45) Date of Patent: Nov. 19, 2013

(54) METHOD, SYSTEM AND DEVICE FOR CONTROLLING HANDOVER OF USER TERMINAL DEVICE

(75) Inventors: Aijuan Liu, Beijing (CN); Ying Wang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 13/560,064

(22) Filed: Jul. 27, 2012

(65) Prior Publication Data

US 2012/0307796 A1   Dec. 6, 2012

Related U.S. Application Data

(63) Continuation of application No. PCT/CN2011/070681, filed on Jan. 27, 2011.

(30) Foreign Application Priority Data

Jan. 29, 2010  (CN) .......................... 2010 1 0103541

(51) Int. Cl.
*H04W 4/00* (2009.01)
*H04W 36/00* (2009.01)

(52) U.S. Cl.
USPC .......................................... 370/331; 455/436

(58) Field of Classification Search
None
See application file for complete search history.

(56) References Cited

U.S. PATENT DOCUMENTS

| | | | |
|---|---|---|---|
| 2008/0130578 A1 | 6/2008 | Wang et al. | |
| 2009/0239538 A1* | 9/2009 | Motegi et al. | 455/436 |
| 2009/0305699 A1* | 12/2009 | Deshpande et al. | 455/434 |
| 2010/0142367 A1* | 6/2010 | Zhang et al. | 370/216 |
| 2010/0240349 A1* | 9/2010 | Jung et al. | 455/414.1 |
| 2010/0240366 A1* | 9/2010 | Bi et al. | 455/435.1 |
| 2011/0075633 A1* | 3/2011 | Johansson et al. | 370/331 |
| 2011/0149905 A1* | 6/2011 | Kim | 370/331 |
| 2011/0218003 A1 | 9/2011 | Qiu | |
| 2011/0286429 A1* | 11/2011 | Vikberg et al. | 370/331 |
| 2012/0190368 A1* | 7/2012 | Zhang et al. | 455/436 |
| 2012/0263111 A1* | 10/2012 | Mochizuki et al. | 370/328 |
| 2012/0263147 A1* | 10/2012 | Takahashi et al. | 370/331 |

FOREIGN PATENT DOCUMENTS

| | | |
|---|---|---|
| CN | 101299876 A | 11/2008 |
| CN | 101489270 A | 7/2009 |

OTHER PUBLICATIONS

Written Opinion from the corresponding international application No. PCT/CN2011/070681 (completion date Apr. 25, 2011) in English and Chinese.
International Search Report for corresponding international application No. PCT/CN2011/070681, mailed May 5, 2011.

* cited by examiner

*Primary Examiner* — Suk Jin Kang
(74) *Attorney, Agent, or Firm* — Marshall, Gerstein & Borun LLP

(57) ABSTRACT

Embodiments of the invention provide a method and system for controlling handover of a user terminal device.

10 Claims, 6 Drawing Sheets

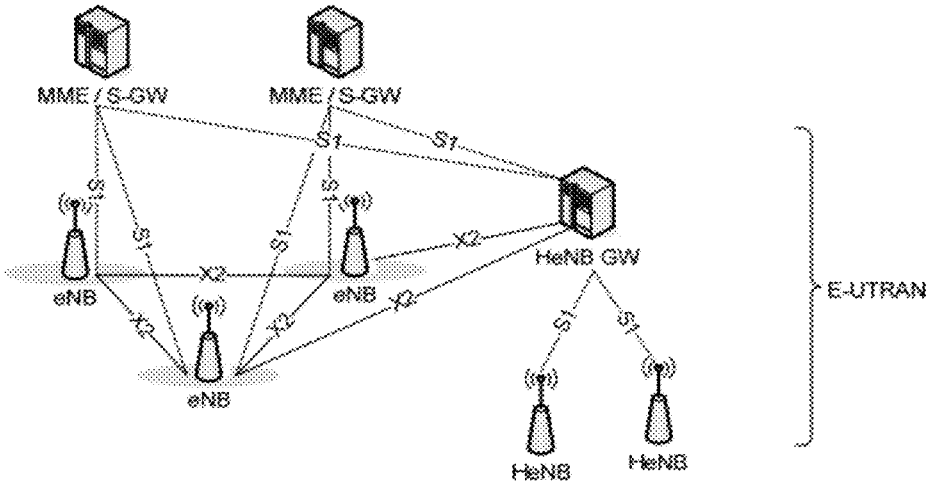

Fig. 3

| The HeNB GW receives a handover request of a UE, on which the handover needs to be performed, sent from the source eNB, and converts the handover request into the handover request which satisfies the interface form between the HeNB GW and the target eNB | S401 |

| Send the handover request acknowledgement message to the HeNB GW if the target eNB permits the UE to access | S402 |

| The HeNB GW receives the handover request acknowledgement message sent from the target eNB, converts the handover request acknowledgement message into the handover request acknowledgement message which satisfies the interface form between the source eNB and the HeNB GW | S403 |

Fig. 4

METHOD, SYSTEM AND DEVICE FOR CONTROLLING HANDOVER OF USER TERMINAL DEVICE

CROSS-REFERENCE TO RELATED APPLICATIONS

This is a continuation of International Patent Application No. PCT/CN2011/070681 filed Jan, 27, 2011, which in turn claims the priority benefit of Chinese Patent Application No. CN 20101013541.9 filed Jan. 29, 2010, the entire respective disclosures of which are incorporated herein by reference.

FIELD OF THE INVENTION

The present invention relates to a mobile communication technology field, and more particularly to a method, system and device for controlling handover of a user terminal device.

BACKGROUND OF THE INVENTION

As shown in FIG. 1, FIG. 1 illustrates network architecture of Evolved Universal Terrestrial Radio Access Network (E-UTRAN) including Home Evolved NodeBs (HeNB)s in Release (R9). An interface between one eNB (also called the Macro-eNB) and another is an X2 interface, and an interface between an eNB and a Mobility Management Entity (MME) is an S1 interface. The HeNB may directly connect with the MME, or connect with the MME through a HeNB Gateway (GW). However, there is no interface between HeNBs, and the HeNB merely can connect with one HeNB GW at the same time.

SUMMARY

The present invention aims at solving at least one of the above problems, more particularly, solving the problem that the handover between the Macro-eNB and the HeNB merely can be implemented through the S1 interface which causes a lot of pressure on the network.

In order to achieve the above objective, an embodiment of the present invention provides a method for controlling handover of a user terminal device, comprising:
  receiving, by a Home Evolved NodeB Gateway (HeNB GW), a handover request of a User Equipment (UE), on which handover needs to be performed, sent from a source eNB, converting the handover request into a handover request which satisfies an interface form between the HeNB GW and a target eNB, and sending the converted handover request to the target eNB; receiving, by the HeNB GW, a handover request acknowledgement message sent from the target eNB if the target eNB permits the UE to access; and
  receiving, by the HeNB GW, the handover request acknowledgement message sent from the target eNB, converting the handover request acknowledgement message into a handover request acknowledgement message which satisfies an interface form between the source eNB and the HeNB GW, and sending the converted handover request acknowledgement message to the source eNB.

Another embodiment of the present invention provides a system for controlling handover of a user terminal device, including: a source eNB, a Home Evolved NodeB Gateway (HeNB GW) and a target eNB.

The source eNB is configured to send a handover request of a UE, on which handover needs to be performed, to the HeNB GW and receive a handover request acknowledgement message sent from the HeNB GW;
  the HeNB GW is configured to receive the handover request of the UE sent from the source eNB, convert the handover request into a handover request which satisfies an interface form between the HeNB GW and the target eNB, send the converted the handover request to the target eNB, and receive the handover request acknowledgement message sent from the target eNB, convert the handover request acknowledgement message into a handover request acknowledgement message which satisfies an interface form between the source eNB and the HeNB GW, and send the converted the handover request acknowledgement message to the source eNB; and
  the target eNB is configured to receive the handover request which satisfies the interface form between the HeNB GW and the target eNB sent from the HeNB GW, and send the handover request acknowledgement message to the HeNB GW if the target eNB permits the UE to access.

Another embodiment of the present invention further provides a Home Evolved NodeB Gateway (HeNB GW), including a receiving module, a constructing module and a sending module.

The receiving module is configured to receive a handover request of a UE, on which handover needs to be performed sent from a source eNB, and a handover request acknowledgement message sent from a target eNB;
  and the constructing module is configured to construct a handover request which satisfies an interface form between the HeNB GW and the target eNB according to the handover request of the UE sent from the source eNB, and construct a handover request acknowledgement message which satisfies an interface form between the source eNB and the HeNB GW according to the handover request acknowledgement message sent from the target eNB; and
  the sending module is configured to send the handover request which satisfies the interface form between the HeNB GW and the target eNB to the target eNB, and send the handover request acknowledgement message which satisfies the interface form between the source eNB and the HeNB GW to the source eNB.

Embodiments of the present invention implement the handover of the UE between the Macro-eNB and the HeNB through the S1 interface between the HeNB and HeNB GW and the X2 interface between the HeNB GW and the Macro-eNB, which simplifies the handover process and reduces the pressure of the core network.

The additional aspects and merits will be provided in the following description. Partial of them will become apparent from the following description or will be known from the embodiments of the present inventions.

BRIEF DESCRIPTION OF DRAWINGS

To make the above and/or additional aspects and merits of the present invention more apparent or easier to understand, the embodiments are described with reference to the accompanying drawings.

FIG. 3 is a schematic diagram illustrating network architecture in which in R10, an X2 interface between a Macro-eNB and HeNB GW is introduced;

FIG. 4 is a flow chart illustrating a handover method in accordance with an embodiment of the present invention;

DETAILED DESCRIPTION OF THE INVENTION

Embodiments of the present invention are described hereafter in detail. Examples of the embodiments are shown in the accompanying figures. From the beginning to the end, same or similar labels denote the same or similar components or components with the same or similar functions. The embodiments which are described with reference to the accompanying drawings are illustrative, are merely used for explaining the present invention, but should not be interpreted as limitations of the present invention.

Figure 1:
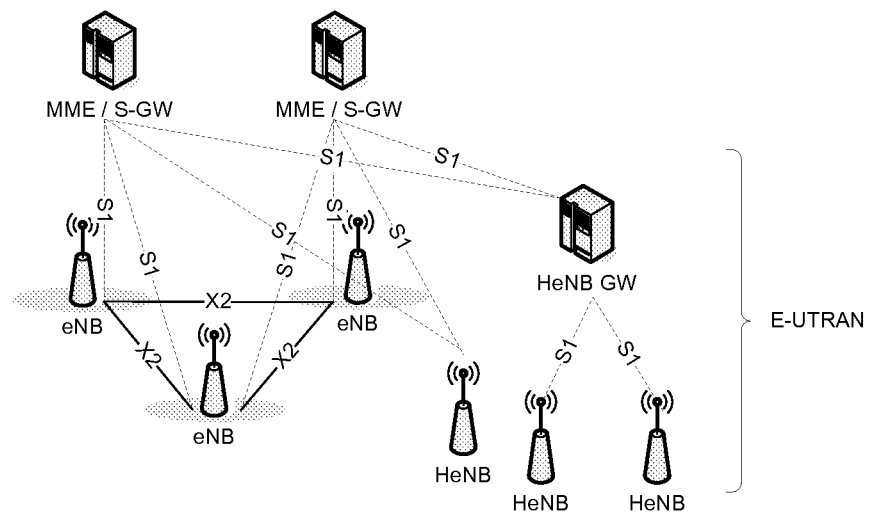
FIG. 1 is a schematic diagram illustrating network architecture of E-UTRAN including HeNBs in an existing R9.
Figure 2:
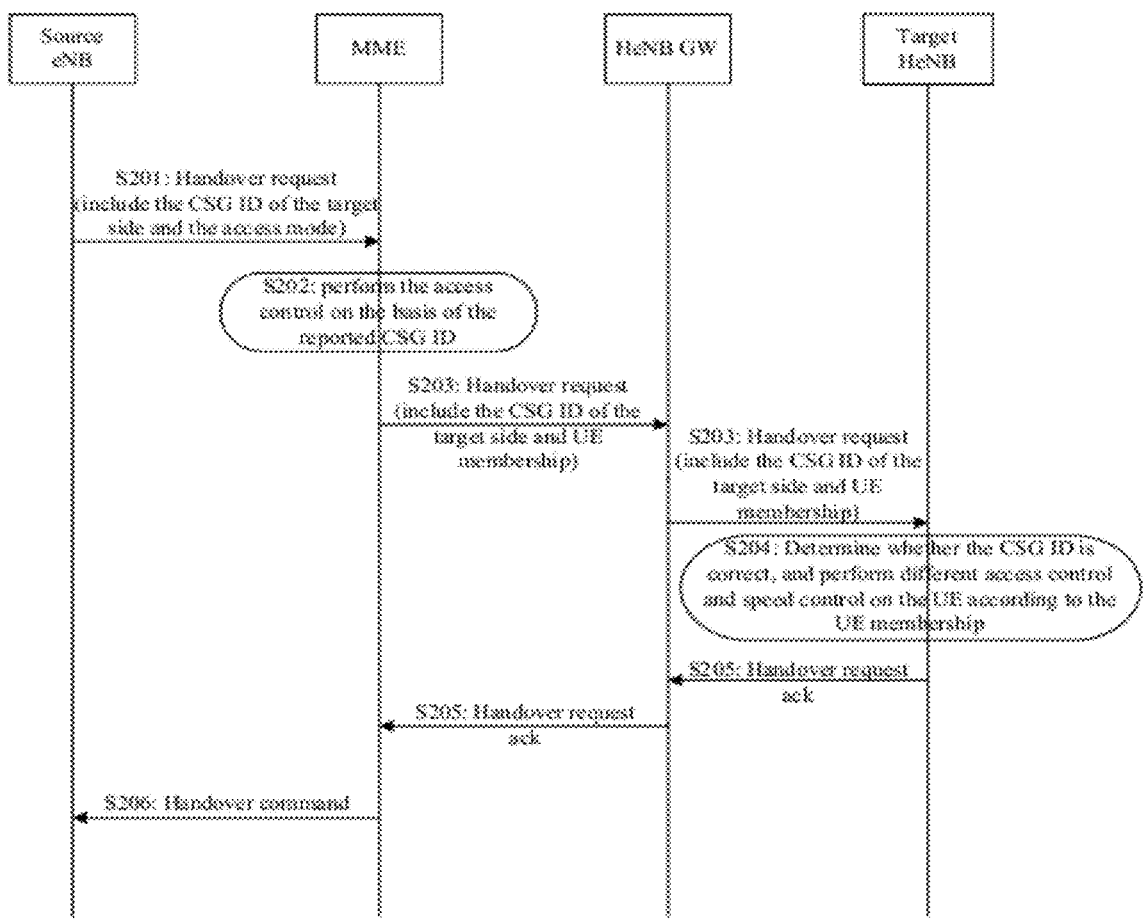
FIG. 2 is a flow chart illustrating S1 handover of a UE between a Macro-eNB and HeNB.

In the network architecture shown in FIG. 1, currently, there is no X2 interface between the HeNB and the Macro-eNB. Therefore, the handover of the UE between the Macro-eNB and HeNB is implemented with the S1 interface. The specific implementation process is shown in FIG. 2, and includes the following blocks.

Block S201: When determining that a UE may make a handover to a target cell, a source eNB (Macro-eNB) sends a handover required message of the UE to an MME. The handover required message includes a Closed Subscriber Group (CSG) Identity (ID) of the target cell. If the target cell is in a mixed mode, an access mode needs to be carried.

Block S202: The MME controls the access of the UE according to the CSG ID of the target cell reported by the source eNB and saved allowed CSG list of the UE.

Block S203: If the access of the UE is permitted, the MME sends a handover request message to the target cell. The handover request message carries the CSG ID of the target cell. If the target cell is in the mixed mode, the handover request message needs to carry UE membership.

Block S204: The target cell determines whether the CSG ID carried by the received handover request matches its CSG ID. If the result of the determination is matching, suitable resources are allocated at the source side. It should be noted that if the target cell is a mixed-mode cell, different access control and speed control need to be carried out according to the UE membership.

Block S205: The target HeNB sends a handover request ack to the MME.

Block S206: The MME sends a handover command message to the source eNB.

The drawback arises in the conventional method that the handover of the UE between the Macro-eNB and HeNB merely can be implemented with the 51 interface. Take into account the characteristic that the HeNB covers a small range, and there are a large number of HeNBs, the frequent handover which is performed through S1 will cause a lot of pressure on the core network. Therefore, a method is needed for solving the above problem.

As shown in FIG. 3, in R10, an X2 interface between a Macro-eNB and HeNB GW is introduced. The present invention aims at implementing the handover of the UE from the Macro-eNB to the HeNB by utilizing the X2 interface between the Macro-eNB and HeNB GW, which may reduce the pressure on the core network.

As shown in FIG. 4, FIG. 4 is a flow chart illustrating a handover method in accordance with an embodiment of the present invention. The method includes the following steps.

Block S401: A HeNB GW receives a handover request of a UE, on which the handover needs to be performed, from a source eNB, converts the handover request into a handover request which satisfies an interface form between the HeNB GW and a target eNB, and sends the converted handover request to the target eNB.

The handover request which satisfies the interface form between the HeNB GW and the target eNB refers to that the handover request may be transmitted through the interface between the HeNB GW and the target eNB.

Block S402: If a target eNB permits the UE to access, the target eNB sends a handover request acknowledgement message to the HeNB GW.

Block S403: The HeNB GW receives the handover request acknowledgement message sent from the target eNB, converts the handover request acknowledgement message into a handover request acknowledgement message which satisfies an interface form between the source eNB and HeNB GW, and sends the converted handover request acknowledgement message to the source eNB.

The handover request acknowledgement message which satisfies the interface form between the source eNB and HeNB GW refers to that the handover request acknowledgement message may be transmitted through the interface between the source eNB and HeNB GW.

The handover method of the present invention is described hereafter taking two embodiments for example. The above and/or additional aspects and merits of the present invention will become more apparent through the description of the specific embodiments.

Embodiment 1

Figure 5:
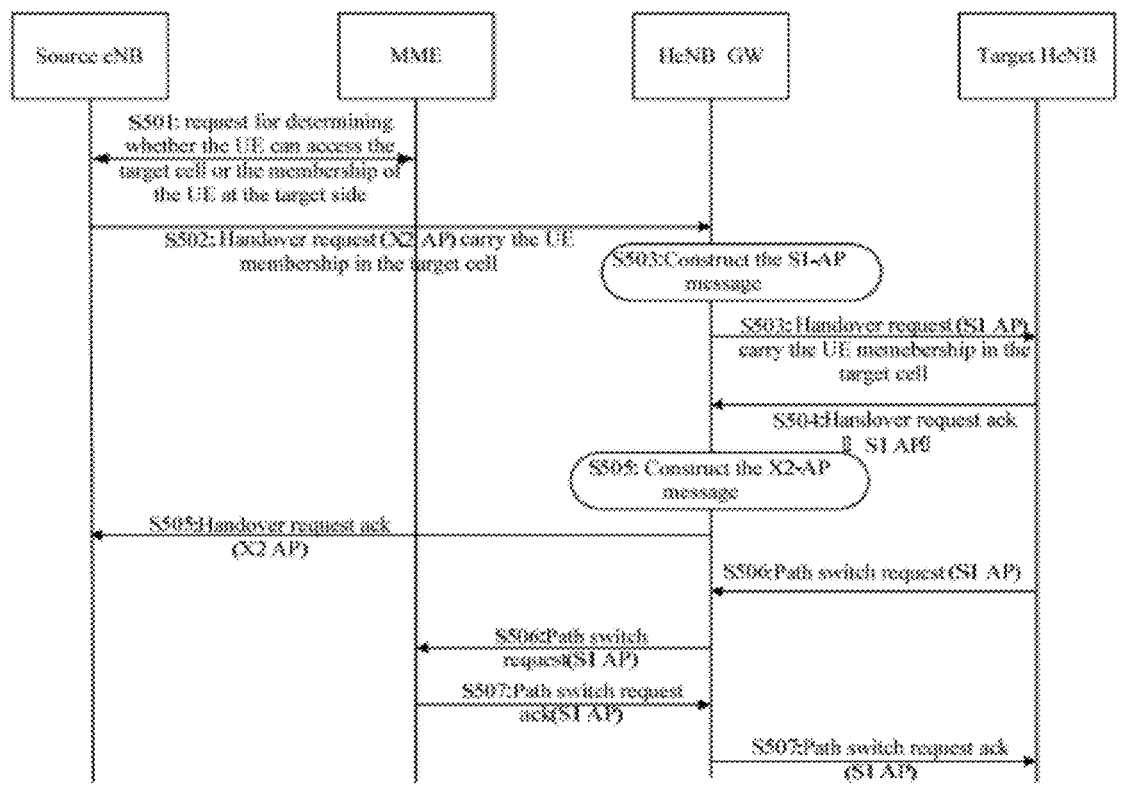
FIG. 5 is a flow chart illustrating inbound handover of a UE from a Macro-eNB to HeNB in accordance with an embodiment of the present invention.

As shown in FIG. 5, FIG. 5 is a flow chart illustrating the inbound handover of the UE from the Macro-eNB to the HeNB, when the source eNB is the Macro-eNB, and the target eNB is the HeNB. The specific inbound method includes the following blocks.

Block S501: When the HeNB is in a closed mode, the Macro-eNB requests the MME to determine whether the access of the UE is permitted. Alternatively, when the target HeNB is in a mixed-mode, the Macro-eNB requests the MME to determine whether the UE is a member of the HeNB.

Block S502: If the access of the UE is permitted, the Macro-eNB sends an X2 AP handover request message of the UE to the HeNB GW. As for a CSG cell in the mixed-mode, the X2 AP handover request message should carry the access mode of the UE in the HeNB.

Block S503: The HeNB GW constructs an S1 AP handover request message according to the X2 AP handover request message, and sends the S1 AP handover request message to the HeNB.

Block S504: The HeNB determines whether the access of the UE is permitted according to current resources state. If the CSG cell is in the mixed-mode, different access control and speed control should be performed on the member UE and non member UE according to the UE membership, and the S1 AP handover request ack message is sent to the HeNB GW.

Block S505: The HeNB GW constructs an X2 AP handover request ack message according to the S1 AP handover request ack message, and sends the X2 AP handover request ack message to the Macro-eNB.

Block S506: The HeNB sends a path switch request message to the MME. If the HeNB connects with the MME through the HeNB GW, the HeNB GW forwards the path switch request message to the MME. In the forwarding process, the HeNB needs to replace the eNB UE S1 AP ID in the path switch request message with the eNB UE S1 AP ID in the HeNB GW.

Block S507: The MME sends the path switch request ack message to the HeNB. If the path switch request ack message is sent to the HeNB through the HeNB GW, the HeNB GW needs to respectively replace the eNB UE S1 AP ID and MME UE S1 AP ID in the path switch request ack message with the eNB UE S1 AP ID and MME UE S1 AP ID stored in the HeNB GW.

Before block S502, the method further includes: sending, by the Macro-eNB, an X2 setup request message to the HeNB GW, sending, by the HeNB GW, an X2 setup response message to the Macro-eNB, by which an X2 interface is established between the Macro-eNB and the HeNB GW.

Embodiment 2

Figure 6:
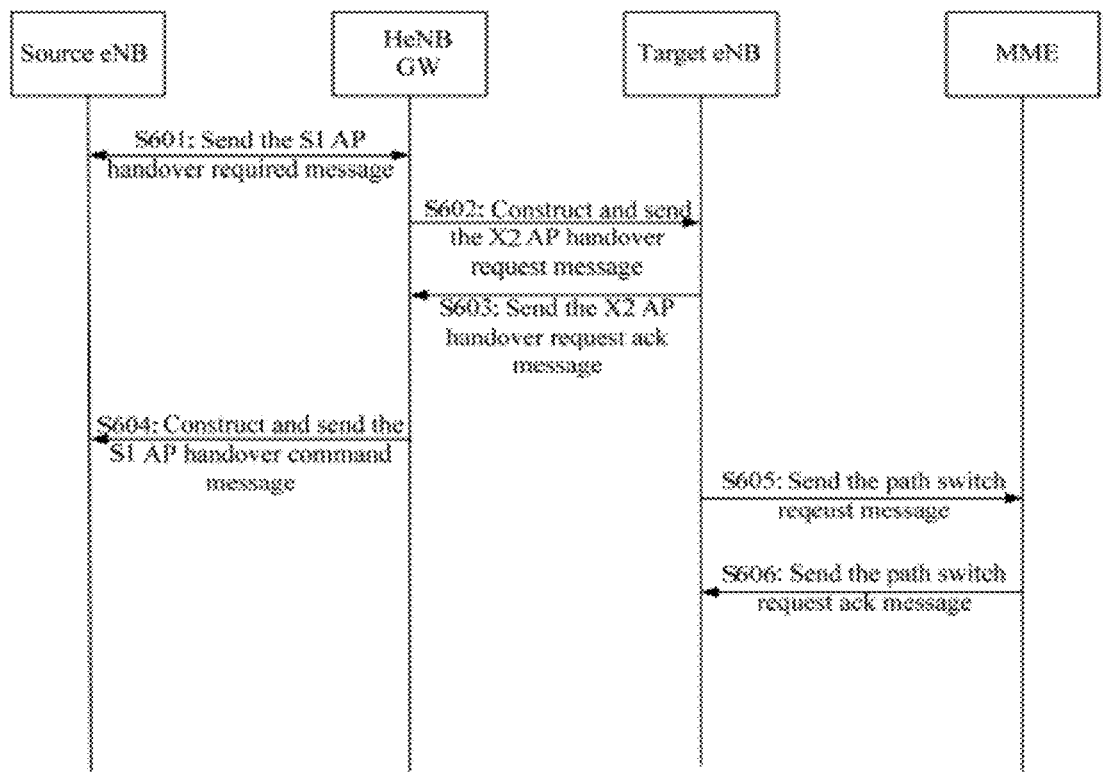
FIG. 6 is a flow chart illustrating outbound handover of a UE from HeNB to a Macro-eNB in accordance with an embodiment of the present invention.

As shown in FIG. 6, FIG. 6 is a flow chart illustrating the outbound handover of the UE from the HeNB to the Macro-eNB, when the source eNB is the HeNB, and the target eNB is the Macro-eNB. The specific outbound method includes the following blocks.

Block S601: A HeNB initiates an S1 handover of a UE, on which the handover needs to be performed, and sends an S1 AP handover required message of the UE to the HeNB GW.

Block S602: After receiving the S1 AP handover required message, the HeNB GW constructs an X2 AP handover request message according to the received S1 AP handover required message and a stored UE context of the HeNB, and sends the X2 AP handover request message to the Macro-eNB.

Figure 7:
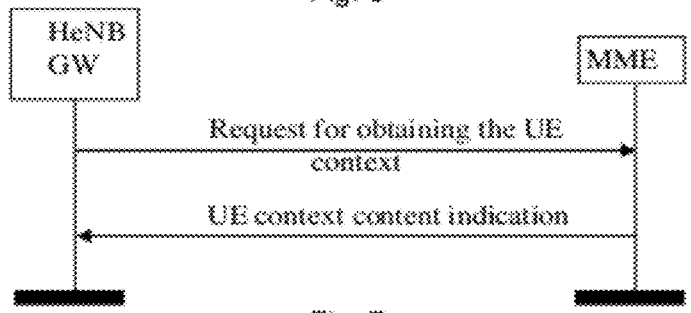
FIG. 7 is a flow chart that a HeNB GW requests an MME for a UE context using a new S1 AP process.

It should be noted that if there is no UE context of the HeNB in the HeNB GW, a new S1 AP process is needed for requesting the UE context of the HeNB from the MME. The new S1 AP process should be a process of class 1, and includes relevant commands of the UE. As shown in FIG. 7, FIG. 7 shows the process that the HeNB GW requests the UE context from the MME. First of all, the HeNB GW sends a requesting message for obtaining the UE context to the MME. The requesting message carries an MME UE S1 AP ID and eNB UE S1 AP ID of the UE. Then, the MME sends a requesting response message to the HeNB GW according to the requesting message of the HeNB GW. The requesting response message carries the MME UE S1 AP ID and eNB UE S1 AP ID of the UE and the UE context.

Block S603: If the Macro-eNB permits the UE to access, the Macro-eNB sends an X2 AP handover request ack message to the HeNB GW.

Block S604: The HeNB GW constructs an S1 AP handover command message according to the X2 AP handover request ack message, and sends the S1 AP handover command message to the HeNB.

Block S605: After the UE accesses the target cell, the Macro-eNB sends a path switch request message to the MME.

Block S606: The MME makes a response to the path switch request message, and send a path switch request ack message to the Macro-eNB.

Before block S606, the method further includes: sending, by the Macro-eNB, an X2 setup request message, sending, by the HeNB GW, an X2 setup response message to the Macro-eNB, by which an X2 interface is established between the Macro-eNB and the HeNB GW.

It should be understood that the above embodiments are merely illustrative embodiments, and are not used for limited the scope of the present invention.

Figure 8:
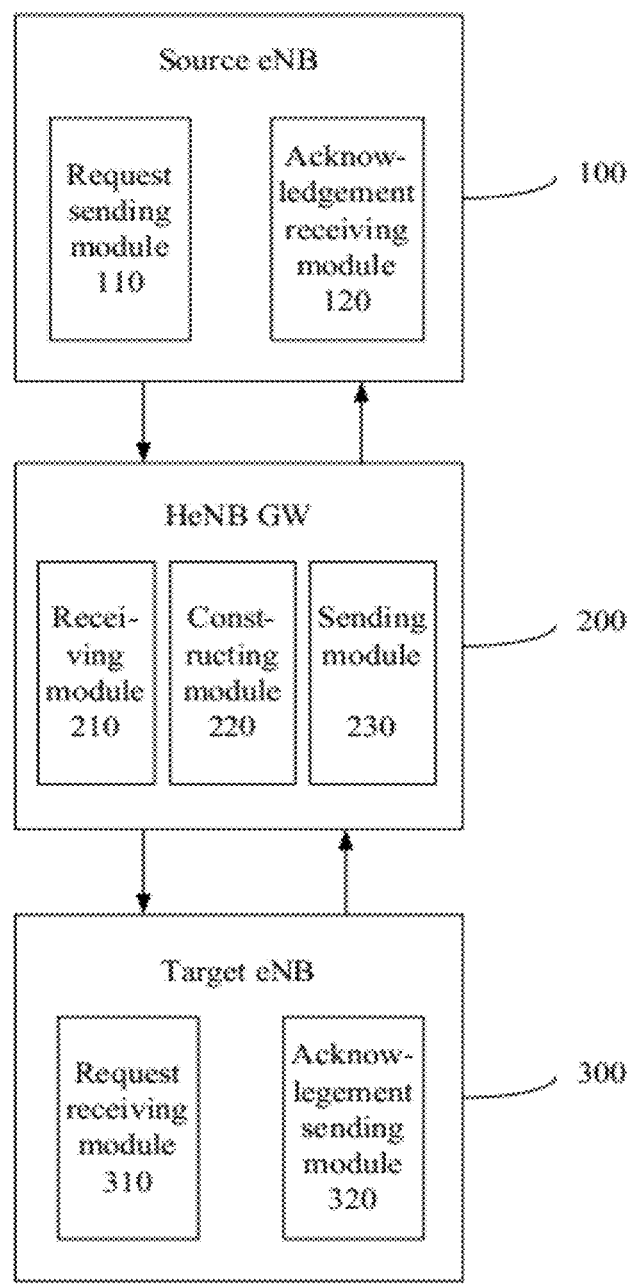
FIG. 8 is a schematic diagram illustrating a handover system in accordance with an embodiment of the present invention.

In order to implement the above methods, an embodiment of the present invention provides a handover system. As shown in FIG. 8, FIG. 8 is a schematic diagram illustrating structure of a handover system in accordance with an embodiment of the present invention. The handover system includes a source eNB 100, a HeNB GW 200 and a target eNB 300. The source eNB 100 is configured to send a handover request of a UE, on which the handover needs to be performed to the HeNB GW 200, and receives a handover request acknowledgement message sent from the HeNB GW 200. The HeNB GW 200 is configured to receive the handover request of the UE sent from the source eNB 100, convert the handover request into a handover request which satisfies an interface form between the HeNB GW 200 and the target eNB 300 and send the converted handover request to the target eNB 300, receive a handover request acknowledgement message sent from the target eNB 300, convert the handover request acknowledgement message into a handover request acknowledgement message which satisfies the interface form between the source eNB 100 and the HeNB GW 200, and send the converted handover request acknowledgement message to the source eNB 100. The target eNB 300 is configured to receive the handover request which satisfies the interface form between the HeNB GW 200 and target eNB 300 sent from the HeNB GW 200, and send the handover request acknowledgement message to the HeNB GW 200 when the target eNB 300 permits the UE to access.

The source eNB 100 includes a request sending module 110 and an acknowledgement receiving module 120. The request sending module 110 is configured to send the handover request of the UE sent from the source eNB 100 to the HeNB GW 200. The acknowledgement receiving module 120 is configured to receive the handover request acknowledgement message which satisfies the interface form between the source eNB 100 and HeNB GW 200 and is sent from the HeNB GW 200.

The HeNB GW 200 includes a receiving module 210, a constructing module 220 and a sending module 230. The receiving module 210 is configured to receive the handover request of the UE sent from the source eNB 100, and receive the handover request acknowledgement message sent from the target eNB 300. The constructing module 220 is configured to construct the handover request which satisfies the interface form between the HeNB GW 200 and target eNB 300 according to the handover request of the source eNB 100, and construct the handover request acknowledgement message which satisfies the interface form between the source eNB 100 and the HeNB GW 200 according to the handover request acknowledgement message sent from the target eNB 300. The sending module 230 is configured to send the handover request which satisfies the interface form between the HeNB GW 200 and the target eNB 300 to the target eNB 300, and send the handover request acknowledgement message which satisfies the interface form between the source eNB 100 and HeNB GW 200 to the source eNB 100.

The target eNB 300 includes a request receiving module 310 and an acknowledgement sending module 320. The request receiving module 310 is configured to receive the handover request which satisfies the interface form between the HeNB GW 200 and target eNB 300 and is sent from the HeNB GW 200. The acknowledgement sending module 320 is configured to send the handover request acknowledgement message to the HeNB GW 200 when the target eNB 300 permits the UE to access.

The handover system further includes an MME 400 (not shown in FIG. 8). The MME 400 is configured to receive a requesting message for obtaining a UE context of the HeNB sent from the HeNB GW 200, and send the UE context of the HeNB to the HeNB GW 200.

The present invention implements the handover of the UE between the Macro-eNB and the HeNB through the S1 interface between the HeNB and HeNB GW and the X2 interface between the HeNB GW and the Macro-eNB. Compared with the handover scheme which is implemented merely through the S1 interface, in the present invention, partial interactions in the handover are implemented with the X2 interface, which avoids the frequency handover through the S1 interface and reduces the pressure of the core network.

In addition, in the conventional method, since the Macro-eNB can not directly interact with the HeNB GW, the MME needs to forward the handover request of the UE, on which the handover needs to be performed, sent from the Macro-eNB to the HeNB GW, and meanwhile forward the handover request acknowledgement message sent from the HeNB GW to the Macro-eNB. In the present invention, the Macro-eNB may directly interact with the HeNB GW through the X2 interface, and the interactions between the Macro-eNB and the HeNB GW are not required to be forwarded by the MME, which reduces the burden of the MME and simplifies the processing procedure.

The foregoing description only describes preferred embodiments of the present invention. It should be pointed out that any modification or improvement without departing from the spirit and principle of the present invention should be made by an ordinary skilled in the art of the present invention, and the modification and improvement should be covered by the protection scope of the present invention.

What is claimed is:

1. A method for controlling handover of a user terminal device, comprising:
   receiving, by a Home Evolved NodeB Gateway (HeNB GW), a handover request of a User Equipment (UE), on which handover needs to be performed, sent from a source eNB, sending, by the HeNB GW, a requesting message for obtaining a UE context to an Mobility Management Entity (MME), the requesting message carrying an MME UE S1 Application Protocol (AP) ID and an eNB UE S1 AP ID of the UE, and receiving a response message from the MME, wherein the response message carries the MME UE S1 AP ID, eNB UE S1 AP ID, and the UE context, converting the handover request into a handover request which satisfies an interface form between the HeNB GW and a target eNB, and sending the converted handover request to the target eNB;
   receiving, by the HeNB GW, a handover request acknowledgement message sent from the target eNB if the target eNB permits the UE to access the target eNB; and
   receiving, by the HeNB GW, the handover request acknowledgement message sent from the target eNB, converting the handover request acknowledgement message into a handover request acknowledgement message which satisfies an interface form between the source eNB and the HeNB GW, and sending the converted handover request acknowledgement message to the source eNB.

2. The handover method of claim 1, wherein when the source eNB is a Macro-eNB and the target eNB is a HeNB,
   receiving, by the HeNB GW, the handover request of the User Equipment (UE), on which the handover needs to be performed, sent from the source eNB, converting the handover request into the handover request which satisfies the interface form between the HeNB GW and the target eNB, sending the converted handover request to the target eNB comprises:
   receiving, by the HeNB GW, an X2 AP handover request message of the UE sent from the Macro-eNB, constructing an S1 AP handover request message according to the X2 AP handover request message, and sending the S1 AP handover request message to the HeNB; wherein
   receiving, by the HeNB GW, the handover request acknowledgement message sent from the target eNB if the target eNB permits the UE to access the target eNB comprises:
   receiving, by the HeNB GW, an S1 AP handover request ack message sent from the HeNB if the HeNB permits the UE to access the target eNB; and wherein
   receiving, by the HeNB GW, the handover request acknowledgement message sent from the target eNB, converting the handover request acknowledgement message into the handover request acknowledgement message which satisfies the interface form between the source eNB and the HeNB GW, and sending the converted handover request acknowledgement message to the source eNB comprises:
   receiving, by the HeNB GW, the S1 AP handover request ack message sent from the HeNB, constructing an X2 AP handover request ack message according to the S1 AP handover request ack message, and sending the X2 AP handover request ack message to the Macro-eNB.

3. The handover method of claim 2, wherein if the HeNB is a HeNB of a mixed-mode, the X2 AP handover request message of the UE, on which the handover needs to be performed, sent from the Macro-eNB carries UE membership of the UE in the HeNB.

4. The handover method of claim 2, further comprising:
   receiving, by the HeNB GW, an X2 setup request message sent from the Macro-eNB; and
   sending, by the HeNB GW, an X2 setup response message to the Macro-eNB.

5. The method of claim 1, wherein when the source eNB is the HeNB and the target eNB is a Macro-eNB, receiving, by the HeNB GW, the handover request of the User Equipment (UE), on which the handover needs to be performed, sent from the source eNB, converting the handover request into the handover request which satisfies the interface form between the HeNB GW and the target eNB, and sending the converted handover request to the target eNB comprises:
   receiving, by the HeNB GW, an S1 AP handover required message of the UE sent from the HeNB, constructing an X2 AP handover request message according to the S1 AP handover required message and the UE context, and sending the X2 AP handover request message to the Macro-eNB; wherein
   receiving, by the HeNB GW, a handover request acknowledgement message sent from the target eNB if the target eNB permits the UE to access the target eNB comprises:
   receiving, by the HeNB GW, an X2 AP handover request ack message sent from the Macro-eNB if the Macro-eNB permits the UE to access the target eNB; wherein
   receiving, by the HeNB GW, the handover request acknowledgement message sent from the target eNB, converting the handover request acknowledgement message into the handover request acknowledgement message which satisfies the interface form between the source eNB and the HeNB GW, and sending the converted handover request acknowledgement message to the source eNB comprises:

receiving, by the HeNB GW, the X2 AP handover request ack message sent from the Macro-eNB, constructing an S1 AP handover command message according to the X2 AP handover request ack message, and sending the S1 AP handover command message to the HeNB.

6. The handover method of claim 5, further comprising:
receiving, by the HeNB GW, an X2 setup request message sent from the Macro-eNB; and
sending, by the HeNB GW, an X2 setup response message to the Macro-eNB.

7. A system for controlling handover of a user terminal device, comprising: a source Evolved NodeB (eNB), a Home Evolved NodeB Gateway (HeNB GW) and a target eNB; wherein
the source eNB is configured to send a handover request of a User Equipment (UE), on which handover needs to be performed, to the HeNB GW and receive a handover request acknowledgement message sent from the HeNB GW;
the HeNB GW is configured to receive the handover request of the UE sent from the source eNB, send a requesting message for obtaining a UE context to an Mobility Management Entity (MME), the requesting message carrying an MME UE S1 AP ID and an eNB UE S1 AP ID of the UE, and receive a response message from the MME, wherein the response message carries the MME UE S1 AP ID, eNB UE S1 AP ID, and the UE context, convert the handover request into a handover request which satisfies an interface form between the HeNB GW and the target eNB, send the converted the handover request to the target eNB, and receive the handover request acknowledgement message sent from the target eNB, convert the handover request acknowledgement message into a handover request acknowledgement message which satisfies an interface form between the source eNB and the HeNB GW, and send the converted the handover request acknowledgement message to the source eNB; and
the target eNB is configured to receive the handover request which satisfies the interface form between the HeNB GW and the target eNB sent from the HeNB GW, and send the handover request acknowledgement message to the HeNB GW if the target eNB permits the UE to access the target eNB.

8. The handover system of claim 7, wherein when the target eNB is a HeNB in a mixed-mode, the handover request message of the UE sent from the source eNB carries UE membership of the UE in the HeNB.

9. The handover system of claim 7, wherein when the source eNB is a Macro-eNB, the HeNB GW is further configured to construct the handover request which satisfies the interface form between the HeNB GW and the target eNB according to the handover request of the UE sent from the Macro-eNB;
when the source eNB is the HeNB, the HeNB GW is further configured to construct the handover request which satisfies the interface form between the HeNB GW and the target eNB according to the handover request of the UE sent from the HeNB and the UE.

10. A Home Evolved NodeB Gateway (HeNB GW), comprising a receiving module, a constructing module and a sending module; wherein
the receiving module is configured to receive a handover request of a User Equipment (UE), on which handover needs to be performed sent from a source Evolved NodeB (eNB), and a handover request acknowledgement message sent from a target eNB, and receive a response message from an Mobility Management Entity (MME), wherein the response message carrying an MME UE S1 AP ID, an eNB UE S1 AP ID, and a UE context;
the constructing module is configured to construct a handover request which satisfies an interface form between the HeNB GW and the target eNB according to the handover request of the UE sent from the source eNB, and construct a handover request acknowledgement message which satisfies an interface form between the source eNB and the HeNB GW according to the handover request acknowledgement message sent from the target eNB; and
the sending module is configured to send a requesting message for obtaining the UE context to the MME, the requesting message carrying the MME UE S1 AP ID and the eNB UE S1 AP ID of the UE, send the handover request which satisfies the interface form between the HeNB GW and the target eNB to the target eNB, and send the handover request acknowledgement message which satisfies the interface form between the source eNB and the HeNB GW to the source eNB.

* * * * *